(No Model.)

W. H. SWIFT.
PORTABLE HEATING APPARATUS FOR WARMING FEET.

No. 346,075. Patented July 20, 1886.

Witnesses.
Thomas Hobday.
John F. C. Plunkett.

Inventor.
William H. Swift.
by Crosby Gregory attys.

UNITED STATES PATENT OFFICE.

WILLIAM H. SWIFT, OF REVERE, MASSACHUSETTS.

PORTABLE HEATING APPARATUS FOR WARMING FEET.

SPECIFICATION forming part of Letters Patent No. 346,075, dated July 20, 1886.

Application filed December 26, 1885. Serial No. 186,764. (No model.)

*To all whom it may concern:*

Be it known that I, WILLIAM H. SWIFT, of Revere, county of Suffolk and State of Massachusetts, have invented an Improvement in Portable Heating Apparatus for Warming Feet, of which the following description, in connection with the accompanying drawings, is a specification, like letters on the drawings representing like parts.

This invention has for its object to construct a portable heating apparatus which may be readily placed in a carriage while traveling, upon or in proximity to which the occupant may place his feet.

In accordance with this invention the heating-chamber is constructed like a box, the bottom and sides of which are preferably made of cast-iron and supplied with suitable vent holes or openings to secure circulation, while the top of the heating-chamber is preferably composed of soapstone or other heat retaining material, secured to the sides by suitable bolts or other fastenings. The heating medium in this instance is shown as an alcohol-lamp, the body thereof containing the alcohol being located adjacent but attached to the heating-chamber, while the wick-tube thereof is of sufficient length to pass through the wall of and into the heating-chamber, so that the lamp when ignited may thoroughly and evenly heat the chamber.

Figure 1:
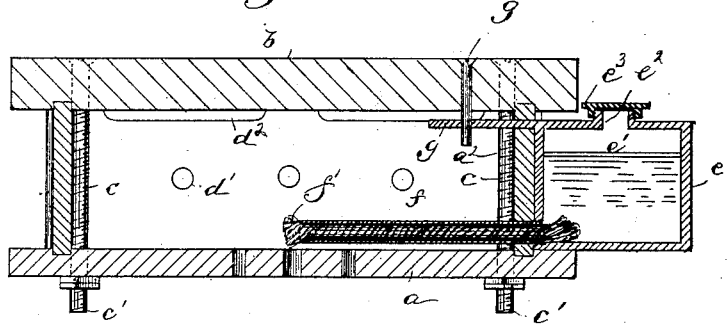
Figure 2:
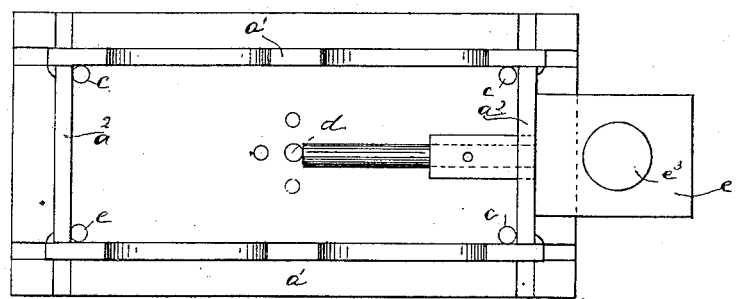
Figure 3:
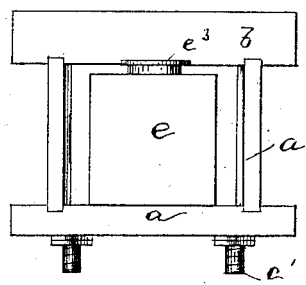

Figure 1 shows in longitudinal section a heating apparatus constructed in accordance with this invention; Fig. 2, a top view of the apparatus, with the top or soapstone plate removed, and Fig. 3, a right-hand end view of Fig. 1.

The apparatus herein to be described is especially adapted to be placed in carriages in cold weather while traveling.

The heating-chamber consists of the base-plate $a$, the side walls, $a'$, and the end walls, $a^2$, all preferably made of cast-iron and united together to form a box-like chamber. A plate, $b$, preferably composed of soapstone or similar material, capable of retaining heat for a long period of time, serves as the top plate of the heating chamber, said plate being joined to the box by bolts $c$ passing vertically through the box at or near the corners thereof, the bolts preferably being extended at their lower ends, as at $c'$, to serve as feet for the apparatus to thereby keep the same elevated above the floor of the vehicle. The base-plate $a$ is provided with vent-holes $d$ at or near its center, and the side walls, $a'$, are also provided with vent-holes $d'$ to create a continuous indraft of air, while elongated vent-openings $d^2$ at the top of the side walls, $a'$, permit the heat generated within the chamber to pass upward.

Located adjacent to and detachably connected with the heating-chamber is a lamp, $e$, (shown in this instance as an alcohol-lamp,) the body $e'$ thereof exterior to the chamber containing the alcohol, which may be fed into the same at the opening $e^2$ in the top thereof, which is tightly closed by the screw-cap $e^3$. Through the lower portion of the body $e'$ of the lamp a wick-tube, $f$, is extended, passing through the end wall, $a^2$, of the heating-chamber and terminating at a point above the vent-opening $d$ in the base-plate $a$. The wick $f'$, passing through the wick-tube into the body or fluid chamber $e'$ of the lamp, when ignited, imparts heat throughout the heating-chamber, and its combustion is supported by the continuous indraft through the vent-holes made in said heating-chamber.

The lamp-body or fluid-chamber $e'$ has connected with it at its top portion an arm, $g$, extending parallel with the wick-tube and through the end wall, $a^2$, of the heating-chamber, while a pin, $g'$, passes downward through the top plate, $b$, and through a hole made in said arm $g$, thereby retaining the lamp in fixed position.

By the apparatus herein described, the heating-chamber may be kept hot by the lamp, and the top plate being composed of soapstone or similar material, thereby forms a heated surface upon which the feet of the occupant may be placed.

It is obvious that while I prefer to employ an alcohol-lamp, an oil-lamp or other heating medium may be employed without departing from this invention, also that the means herein described for detachably connecting the said lamp with the heating-chamber may be modified as circumstances may require.

The apparatus, while especially adapted for the comfort of persons while riding, is equally applicable for many other purposes, and for convenience in carrying the same about any suitable handle may be applied.

I claim—

1. The combination of a heating-chamber composed of the base-plate $a$, side walls, $a'$, end walls, $a^2$, and imperforate heat-absorbing top plate, $b$, and connecting-bolts with a heating device, substantially as described, detachably connected with said heating-chamber, the wick-tube of said heating apparatus extending through the end wall of and into said heating-chamber, all substantially as described.

2. The combination of a heating-chamber composed of the base-plate $a$, having vent-holes $d$, the side walls, $a'$, having vent-openings $d'$ $d^2$, and the top plate, $b$, with bolts $c$, having the extended end portions, $c'$, forming feet for the device, the lamp detachably connected with the said heating-chamber, and its extended wick-tube $f$, substantially as described.

3. The heating-chamber consisting of the perforated base-plate $a$, perforated side walls, $a'$, end walls, $a^2$, soapstone top plate, $b$, and connecting-bolts $c$, combined with the lamp $e$, having the wick-tube extended into the heating-chamber, and the arm $g$ and pin $g'$, substantially as shown and described.

In testimony whereof I have signed my name to this specification in the presence of two subscribing witnesses.

WILLIAM H. SWIFT.

Witnesses:
BERN. J. NOYES,
C. M. CONE.